United States Patent [19]

Fantuzzo et al.

[11] Patent Number: 5,043,744
[45] Date of Patent: Aug. 27, 1991

[54] RASTER SCANNER INCLUDING SCANNING BEAM TILT CORRECTION

[75] Inventors: Joseph Fantuzzo, Webster; Thomas Robson, Penfield, both of N.Y.

[73] Assignee: Xerox Corporation, Stamford, Conn.

[21] Appl. No.: 524,895

[22] Filed: May 18, 1990

[51] Int. Cl.$^5$ .................... 355 208; 355 233; 358 296; 358 409; 358 474; 359 218; G01D 9/42
[52] U.S. Cl. .................................................. 346/108
[58] Field of Search ............. 355/202, 208, 233, 239; 382/61; 358/296, 486, 488, 489, 490, 493, 494, 497, 409, 474; 250/234, 235, 236; 350/6.1, 6.5, 6.7, 6.8; 346/108, 160

[56] References Cited

U.S. PATENT DOCUMENTS

| | | | |
|---|---|---|---|
| 3,541,248 | 11/1970 | Young | 178/6.6 |
| 4,349,847 | 9/1982 | Traino | 358/293 |
| 4,580,889 | 4/1986 | Hiranuma et al. | 355/327 |
| 4,731,638 | 3/1988 | Cherian | 355/200 |

Primary Examiner—A. T. Grimley
Assistant Examiner—Christopher Horgan

[57] ABSTRACT

A raster output scanner in which a movable scanning element scans a high intensity beam across a movable imaging member to record images thereon. The velocity of the imaging member is controlled relative to the beam, and the tilt of the beam is adjusted relative to the imaging member.

14 Claims, 3 Drawing Sheets

RASTER SCANNER INCLUDING SCANNING BEAM TILT CORRECTION

This invention relates generally to a color electrophotographic printing machine, and more particularly concerns a raster output scanner for producing a high intensity imaging beam which scans across a movable photoconductive member to record electrostatic latent images thereon.

In an electrophotographic printing machine, a photoconductive member is charged to a substantially uniform potential to sensitize the surface thereof. The charged portion of the photoconductive member is exposed. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a toner image on the photoconductive member which is subsequently transferred to a copy sheet. The toner image is heated to permanently affix it to the sheet in image configuration.

Multi-color electrophotographic printing is substantially identical to the foregoing process of black and white printing. However, rather than forming a single latent image on the photoconductive surface, successive latent images corresponding to the different colors desired in the copy are recorded. Each single color electrostatic latent image is developed with the appropriately colored toner. The single color toner images are transferred to the copy sheet in superimposed registration with one another. This creates a multi-layered toner image on the copy sheet. Thereafter, the multi-layered toner image is permanently affixed to the copy sheet creating a color copy. The developer material may be a liquid material or a powder material.

A raster output scanner may be used to expose the charged portions of the photoconductive member to record the electrostatic latent image thereon. Generally, a raster output scanner has a laser for generating a collimated beam of monochromatic radiation. The laser beam is modulated in conformance with the image information. The modulated beam is reflected through a lens onto a scanning element, i.e. a rotating polygon having mirrored facets. The beam reflected from the polygon through a lens which focuses the scanning beam onto the charged portion of the photoconductive member. When a photoconductive drum is used, variations in the motion of the photoconductive member lead to the problem of banding in the image. Traditionally, this problem has been solved by an expensive drum servo system. In addition, in color printing machines, differences in eccentricity and out of roundness in drums can result in registration problems in tandem and multi-start single drum machines. Various types of control systems have been devised for regulating the velocity of a photoconductive drum. The following disclosures appear to be relevant:

U.S. Pat. No. 3,541,248.
Patentee: Young.
Issued: Nov. 17, 1970.
U.S. Pat. No. 4,349,847.
Patentee: Traino.
Issued: Sept. 14, 1982.
U.S. Pat. No. 4,580,889.
Patentee: Hiranuma et al.
Issued: Apr. 8, 1986.
U.S. Pat. No. 4,731,638.
Patentee: Cherian.
Issued: Mar. 15, 1988.

The relevant portions of the foregoing patents may be briefly summarized as follows:

U.S. Pat. No. 3,541,248 describes a hand held optical scanner in which a wheel is rolled across a document being scanned. A light source and a photocell are used to detect the rotation of the spokes of the wheel rotating across the document so as to measure the velocity of the scanner.

U.S. Pat. No. 4,349,847 discloses a raster output scanner having a laser beam and a rotating polygon scanning the beam across the charged photoconductive belt. The belt has timing marks which are detected by a light source and photosensor. The output from the photosensor corresponds to the belt velocity. This signal is used to control the angular velocity of the polygon.

U.S. Pat. No. 4,580,889 describes a color reproduction apparatus having a plurality of marking units arranged around a transfer drum supporting a copy sheet thereon. Each marking unit uses a raster output scanner having a laser to record a latent image on a photoconductive drum. Each marking unit develops the latent image with a different color toner, i.e., cyan, magenta, yellow or black. The developed images are transferred to the copy sheet in superimposed registration with one another to form a color copy on the sheet. Timing of each marking unit is controlled by a system controller in response to conveying timing of the copy sheet.

U.S. Pat. No. 4,731,638 discloses a timing disc mounted on the shaft of a photoconductive drum to rotate therewith. A light source and a photodetector are used to generate electrical pulses. The timing of the electrical pulses corresponds to the angular velocity of the drum.

Pursuant to the features of the present invention, there is provided a raster output scanner of the type in which a high intensity beam records images on a movable imaging member. A movable scanning element scans the beam across the imaging member. The improvement includes means for detecting the position of the beam relative to the imaging member and generating a position signal indicative thereof. Means, responsive to the position signal, control the velocity of the imaging member relative to the beam. Means, responsive to the position signal, adjust the tilt of the beam relative to the imaging member.

In another aspect of the present invention, there is provided a printing machine of the type in which a raster output scanner produces a high intensity imaging beam which scans across a movable photoconductive member to record electrostatic latent images on the movable photoconductive member. The printing machine includes a control system, operatively associated with the raster output scanner and the photoconductive member, for adjusting the velocity of the photoconductive member relative to the beam and the tilt of the beam relative to the photoconductive member to align the beam to the photoconductive member.

Other aspects of the present invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
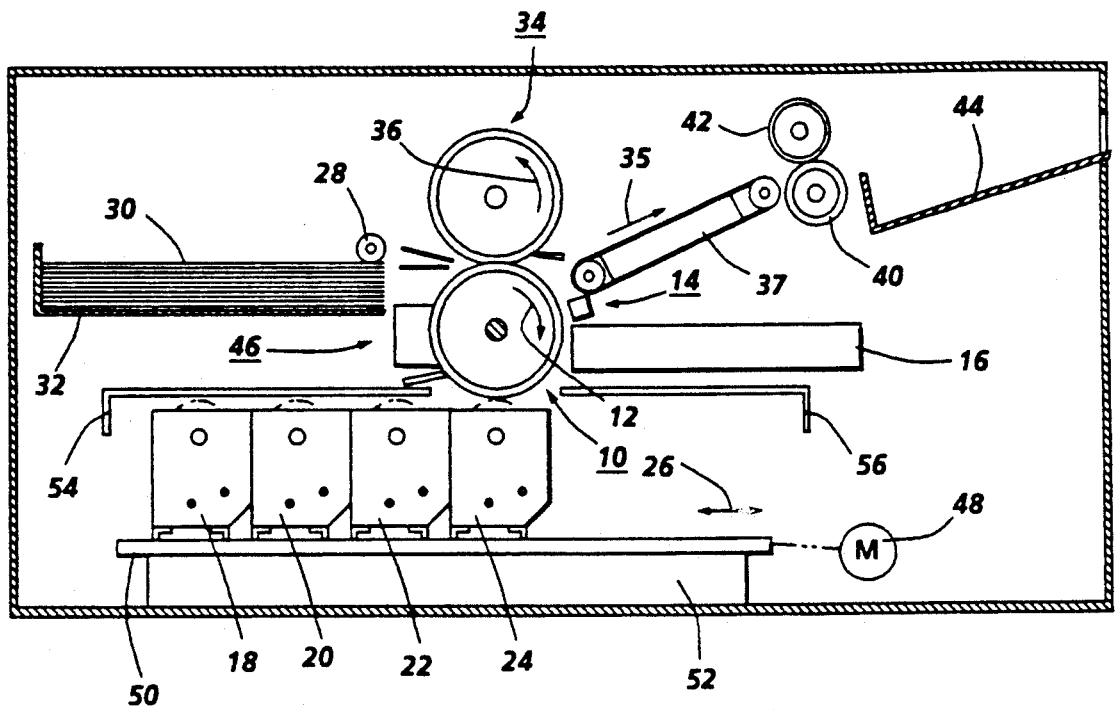
FIG. 1 is a schematic elevational view illustrating a color electrophotographic printing machine incorporating the features of the present invention therein.

For a general understanding of the features of the present invention, reference is made to the drawings. In the drawings, like references have been used throughout to designate identical elements. FIG. 1 depicts a color electrophotographic printing machine incorporating the features of the present invention therein. It will become evident from the following discussion that the present invention is equally well suited for use in a wide variety of printing machines, and is not necessarily limited in its application to the particular machine shown herein.

Figure 3:
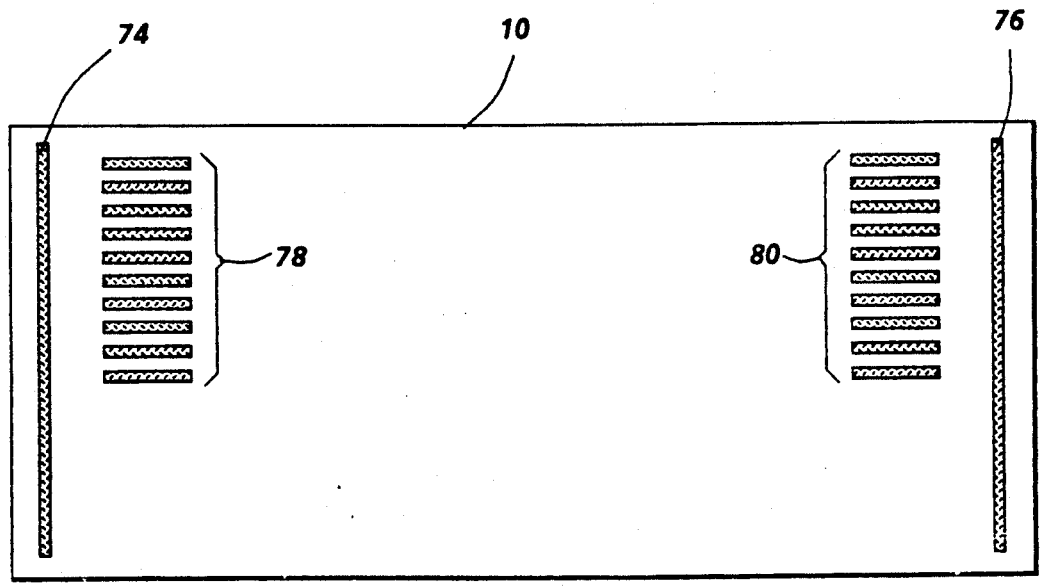
FIG. 3 is a plan view of the photoconductive drum used in the FIG. 1 printing machine showing the timing marks thereon.

Turning initially to FIG. 1, there is shown a color electrophotographic printing machine employing a photoconductive drum 10. Preferably, photoconductive drum 10 is made from a photoconductive material such as selenium. However, any suitable photoconductive material may be used. As shown in FIG. 3, timing marks and end of scan (EOS) and start of scan (SOS) marks are located on opposed side marginal regions of drum 10. Drum 10 rotates in the direction of arrow 12 to advance successive portions of the photoconductive surface sequentially through the various processing stations disposed about the path of movement thereof.

Initially, a portion of photoconductive drum 10 passes through the charging station. At the charging station, a corona generating device, indicated generally by the reference numeral 14 charges photoconductive drum 10 to a relatively high, substantially uniform potential.

Figure 2:
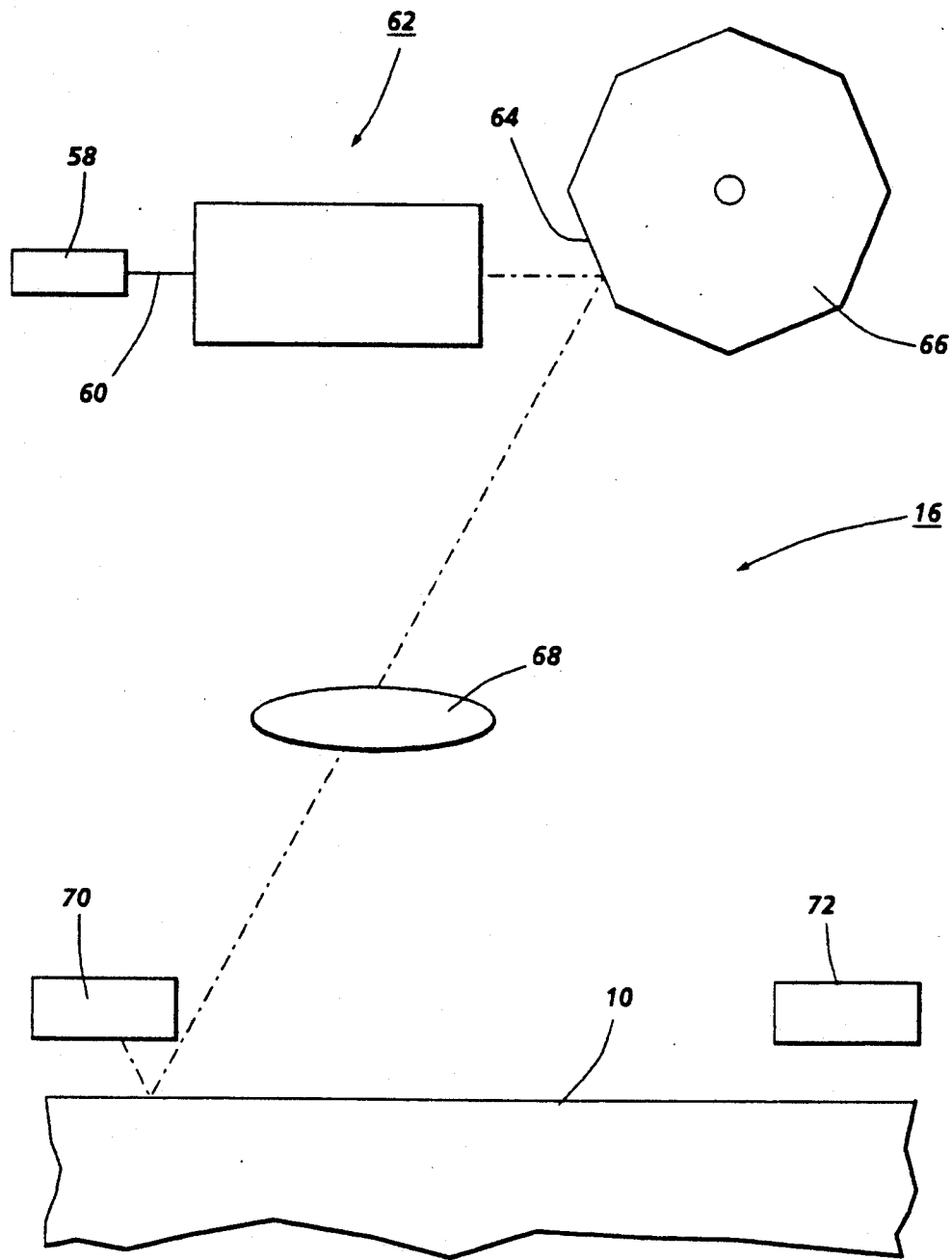
FIG. 2 is a schematic elevational view showing the raster output scanner of the FIG. 1 printing machine.

Next, the charged photoconductive surface is rotated to the exposure station. The exposure station includes an electronic subsystem (ESS) that transmits a set of signals corresponding to a series of raster scan lines of different colors for the copy. These signals are transmitted to a raster output scanner (ROS) 16. ROS 16 includes a laser with rotating polygon mirror blocks or facets. The ROS illuminates the charged portion of photoconductive drum 10 at a rate of about 400 pixels per inch. FIG. 2 shows ROS 16 in greater detail. The ROS will expose the photoconductive drum to record three or four latent images. One latent image is adapted to be developed with cyan developer material. Another latent image is adapted to be developed with magenta developer material with the third latent image being developed with yellow developer material. The fourth latent image may be developed with black toner particles. The latent images formed by the ROS on the photoconductive drum correspond to the signals from the electronic subsystem (ESS).

After the electrostatic latent image has been recorded on photoconductive drum 10, drum 10 advances the electrostatic latent image to the development station. The development station includes four individual developer units generally indicated by the reference numerals 18, 20, 22 and 24. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Developer units 18, 20 and 22, respectively, apply toner particles of a specific color which corresponds to the compliment of the specific color separated electrostatic latent image recorded on the photoconductive surface. The color of each of the toner particles is adapted to absorb light within a preselected spectral region of the ei tromagnetic wave spectrum. For example, an electrostatic latent image formed by discharging the portions of charge on the photoconductive drum corresponding to the green regions will record the red and blue portions as areas of relatively high charge density on photoconductive drum 10, while the green areas will be reduced to a voltage level ineffective for development. The charged areas are then made visible by having developer unit 18 apply green absorbing (magenta) toner particles onto the electrostatic latent image recorded on photoconductive drum 10. Similarly, a blue region is developed by developer unit 20 with blue absorbing (yellow) toner particles, while the red region is developed by developer unit 22 with red absorbing (cyan) toner particles. Developer unit 24 contains black toner particles and may be used to develop the electrostatic latent image formed from a black and white original document. Each of the developer units is moved into and out of the operative position. In the operative position, the developer unit is in the development zone with the magnetic brush being closely adjacent the photoconductive drum, while, in the non-operative position, the magnetic brush is spaced therefrom. During development of each electrostatic latent image only one developer unit is in the operative position, the remaining developer units are in the non-operative position. This insures that each electrostatic latent image is developed with toner particles of the appropriate color without comingling. In FIG. 1, developer unit 24 is shown in the operative position with developer units 18, 20 and 22 being in the non-operative position. The developer units in the non-operative position are sealed to prevent the escape of toner therefrom and to prevent contamination of the developer material in each developer unit. A shield 54, located on one side of the development zone, seals the non-operative developer units located on that side of the development zone. A similar shield 56, located on the other side of the development zone, seals the non-operative developer units located on that side of the development zone. A motor 48 coupled to developer carriage 50 translates the developer units in a horizontal direction, as indicated by arrow 26, between the non-operative positions and the operative position. A housing 52 having a chamber therein, is mounted beneath developer carriage 50 for storing waste toner.

After development, the toner image is moved to the transfer station where the toner image is transferred to a sheet of support material, such as plain paper amongst others. At the transfer station, the sheet feeder, indicated generally by the reference numeral 28, separates the uppermost sheet from a stack of sheets 30 supported on tray 32. The sheet is advanced to the transfer drum, indicated generally by the reference numeral 34, and secured thereto. Transfer drum 34 rotates in the direction of arrow 36 to transport the sheet secured releasably thereto in a recirculating path. An electrical bias having a suitable polarity and magnitude is applied to drum 34 to attract successive different color toner images to the sheet secured thereto.

After the last transfer operation, the sheet is released from the drum and advanced by a conveyor 37, in the direction of arrow 35, to the fusing station. At the fusing station the sheet passes through the nip defined by a heated fuser roll 40 and a pressure roll 42. The toner image contacts fuser roll 40 so as to be affixed to the sheet. Thereafter, the sheet is advanced to catch tray 44 for subsequent removal therefrom by the machine operator.

A cleaning station, indicated generally by the reference numeral 46, includes a cleaning blade periodically moved into and out of contact with drum 10. The blade is moved into contact with the photoconductive drum when there is no toner image thereon so as to remove residual toner particles remaining after the transfer operation. Any residual charge remaining on the photoconductive drum is also removed therefrom prior to the start of the next successive cycle by illuminating drum 10.

Referring now to FIG. 2, there is shown further details of ROS 16. As depicted thereat, ROS 16 is provided with a laser 58 for generating a collimated beam 60 of monochromatic radiation. A modulator and beam shaping optics, indicated generally by the reference numeral 62, modulate the beam in accordance with the image information received from the ESS. One skilled in the art will appreciate that any suitable modulator may be used for imparting video information to beam 60. For example, the modulator may be a Pockel's cell 60 having a potassium dihydrogen phosphate crystal, whose index of refraction is periodically varied by the application of the varying voltage which represents the image signals. The beam shaping optics also has an acousto-optic deflector which tilts the beam to correct for any beam to drum mis-positioning. The image signals, which may impart information either by binary pulse code modulation or wide band frequency code modulation, represent discrete picture elements referred to as pixels herein. The beam shaping optics focuses beam 60 onto at least one facet 64 of polygon 66. The rotational axis of polygon 66 is normal to the plane in which beam 60 travels. Facets 64 of polygon 66 are mirrored surfaces suitable for reflecting any radiated beam impinging thereon. Alternatively, scanning may be effected by any other suitable device. A lens 68 is positioned in the optical path between polygon 66 and photoconductive drum 10. Lens 68 is of a diameter suitable to focus the beam reflected from facets 64 of rotating polygon 66 onto the surface of drum 10. While the imaging member is depicted herein as a photoconductive drum, other types of imaging members, such as belts, webs, etc., may be used. Polygon 66 is preferably driven by a hysteresis synchronous motor through a shaft with the angular velocity of polygon 66 synchronized with the angular velocity of drum 10. During operation, the rotating polygon 66 scans or sweeps beam 60 across the photoconductive surface of drum 10. Beam 60 traces a scan line on the photoconductive surface of drum 10. Photodetectors 70 and 72 provided adjacent opposed side marginal regions of drum 10 and astride the path of the scanning beam generate a pulse each time beam 60 sweeps across the photoconductive surface and passes over the start of scan line (SOS) and end of scan line (EOS). This establishes the start of scan and end of scan signals respectively. These lines as well as the timing marks on drum 10 are shown in FIG. 3 and will be discussed hereinafter with reference thereto. A predetermined velocity relationship is required between the photoconductive drum and the scanning element, i.e. polygon 66. Where this velocity relationship is disturbed by changes in the velocity of drum 10, image distortions may result.

Turning now to FIG. 3, there is shown drum 10 having SOS line 74 located thereon in one side marginal region. EOS line 76 is located on the other side marginal region of drum 10. A set of timing marks 78 are located on the first mentioned side marginal region of drum 10. Another set of timing marks 80 are located on the second mentioned side marginal region of drum 10. The sets of timing marks 78 and 80 on drum 10 provide the basic synchronization for the control system. These marks are shown as bars, however, one skilled in the art will appreciate that a checker board set of marks may also be used. As the beam, scans across drum, photodetectors 70 and 72 generate pulses. When the pulses generated by the photodetectors on either side of the drum, the beam is aligned with the timing marks and it must be adjusted in position. The system is set so that a nul balance indicates that the beam is aligned. This information is processed in accordance with the control scheme shown in FIG. 4 and the drum velocity and beam tilt corrected.

Figure 4:
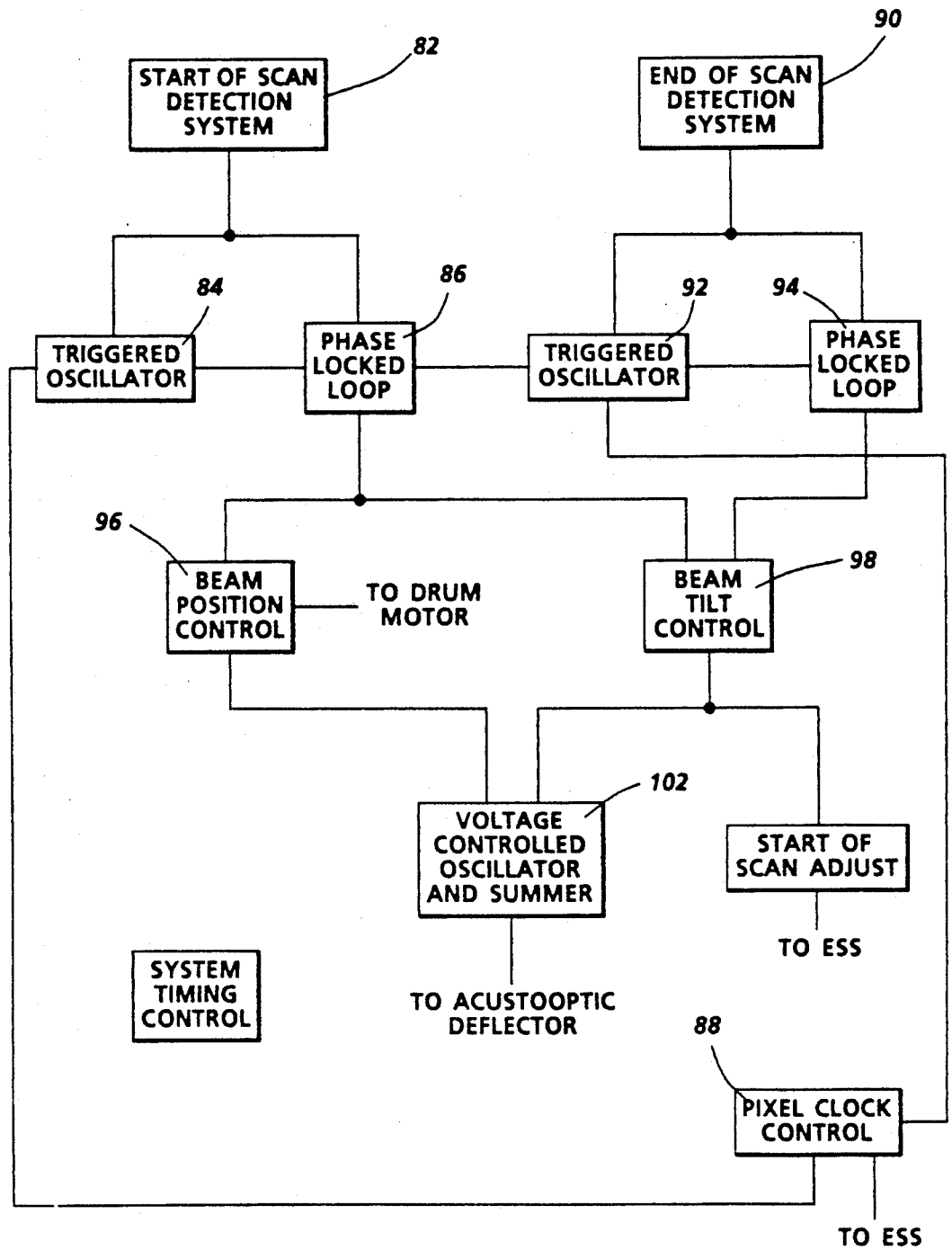
FIG. 4 is a block diagram illustrating the control scheme for regulating the velocity of the photoconductive drum and the tilt of the raster output scanner beam.

FIG. 4 illustrates the control scheme used to regulate the velocity of drum 10 and the tilt of beam 60. As shown therein, photodetector 70 detects when the beam impinges on SOS line 74. The signal from photodetector 70 is transmitted to a SOS detection system 82. The output from the SOS detection system 82 triggers an oscillator 84 and is transmitted to a phase locked loop 86. The signal from oscillator 84 is sent to a pixel clock control 88. Similarly, photodetector 72 detects when the beam impinges on EOS line 76. The signal from photodetector 72 is transmitted to an EOS detection system 90. The output from the EOS detection system 90 triggers an oscillator 92 and is transmitted to a phase locked loop 94. The signal from oscillator 92 is also sent to a pixel clock control 88. Pixel clock control generates a pixel control signal as a function of the signals received from oscillators 84 and 92. The pixel control signal is transmitted to the ESS to regulate the pixel signals used to modulate the beam. Phase locked loop 86 transmits a signal to beam position control 96. The pulses from photodetectors 70 and 72, as sets of timing marks 78 and 80 are detected, are transmitted to beam position control 96 to determine the angular velocity of drum 10. The measured angular velocity of drum 10 is compared to the desired angular velocity and a velocity error signal produced. The velocity error signal is used to control the power supply energizing the motor rotating drum 10. In this way, the angular velocity of drum 10 is regulated. The output from phase locked loop 86 is also transmitted to oscillator 92 and to beam tilt control 98. The signals from beam position control 96 and beam tilt control 98 are sent to a voltage controlled oscillator and summer 102. The output from summer 102 is a beam tilt error signal which adjusts the orientation of the acousto-optic deflector. The position of the acousto-optic deflector determines the tilt of the beam. The signal from beam tilt control 98 is also transmitted to a start of scan adjust controller which sets the start of scan and transmits the start of scan signal to the ESS.

In operation, the timing marks on drum 10 provide the basic synchronization for the system. As the beam crosses the drum it first encounters the start of scan line, SOS, and triggers the start of scan detection system which in turn triggers the pixel clock and triggers oscillator 84. The signal from oscillator 84 is used to lock into the correct frequency, derived as the beam crosses the timing marks. As the beam continues its sweep, its reflection is modulated in intensity as it crosses the timing marks. This signal is fed into phase locked loop 86. The output from phase locked loop 86 will be zero when the beam falls exactly between two rows of timing marks. At this point, there is no modulation. The signal swings positive and negative as the beam moves up or down. In this way, a signal is derived indicating the relative positions of the beam and the drum. A similar process occurs at the other side of the drum with the end of scan detector. These signals are used to align the beam to the drum by providing a beam position control signal and a beam tilt signal. In addition, the beam position control signal is used to adjust the angular velocity of the drum drive motor to make certain that the beam does not reach beyond its range of travel. The beam tilt signal is also used to adjust the start of scan signal to account for the conicalness in the drum causing the image to drift across the page. With this system images may be registered with one another by accounting for motion quality disturbances in the drives.

In recapitulation, the raster output scanner of the present invention has beam tilt measured and corrected by using a set of timing marks on opposed side marginal regions of the photoconductive drum. The timing marks generate pulses and the magnitude of these pulses determine the tilt of the beam. The pulse control the angular velocity of the drum. Beam tilt and drum velocity are controlled as a function of these signals.

It is, therefore, evident that there has been provided in accordance with the present invention, a raster output scanner that fully satisfies the aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

We claim:

1. A raster output scanner of the type in which a high intensity beam records images on a movable imaging member, a movable scanning element scans the beam across the imaging member, wherein the improvement includes:

means for detecting the position of the beam relative to the imaging member and generating a position signal indicative thereof;

means, responsive to the position signal, for controlling the velocity of the imaging member relative to the beam; and means, responsive to the position signal, for adjusting the tilt of the beam relative to the imaging member.

2. A raster output scanner of the type in which a high intensity beam records images on a movable imaging member, and a movable scanning element scans the beam across the imaging member, wherein the improvement includes:

a first set of timing marks being positioned on a first side marginal region of the imaging member, a first detector, responsive to the beam reflected from the imaging member in the first side marginal region having said first set of timing marks thereon, to generate a first signal, a second set of timing marks being positioned on a second side marginal region of the imaging member and opposed from the first side marginal region, and a second detector, responsive to the beam reflected from the imaging member in the second side marginal region having said second set of timing marks thereon, to generate a second signal;

means, responsive to the first signal, for controlling the velocity of the imaging member relative to the beam; and means, responsive to the first and second signals, for adjusting the tilt of the beam relative to the imaging member.

3. A scanner according to claim 2, wherein said controlling means includes a drive motor coupled to the imaging member, said drive motor being responsive to the first signal from said first detector for adjusting the velocity of the imaging member.

4. A scanner according to claim 2, wherein said adjusting means includes an acousto-optic deflector, responsive to the first signal and the second signal, for adjusting the tilt of the beam relative to the imaging member.

5. A scanner according to claim 2, further including means, responsive to the first signal and the second signal, for setting the start of scan of the scanning element.

6. A printing machine of the type in which a raster output scanner produces a high intensity imaging beam which scans across a movable photoconductive member to record electrostatic latent images on the movable photoconductive member, including:

a control system, operatively associated with the raster output scanner and the photoconductive member, for adjusting the velocity of the photoconductive member relative to the beam and the tilt of the beam relative to the photoconductive member to align the beam to the photoconductive member.

7. A printing machine of the type in which a raster output scanner produces a high intensity imaging beam which scans across a movable photoconductive member to record electrostatic latent images on the movable photoconductive member, including:

a first set of timing marks being positioned on a first side marginal region of the photoconductive member, and a first detector, responsive to the beam reflected from the photoconductive member in the first side marginal region having said first set of timing marks thereon, to generate the first signal, a second set of timing marks being positioned on a second side marginal region of the photoconductive member and opposed from the first side marginal region, and a second detector, responsive to the beam reflected from the photoconductive member in the second side marginal region having said second set of timing marks thereon, to generate a second signal;

means, responsive to the first signal, for regulating the velocity of the photoconductive member relative to the beam; and means, responsive to the first and second signals, for adjusting the tilt of the beam relative to the photoconductive member.

8. A printing machine according to claim 7, wherein said regulating means includes a drive motor coupled to the photoconductive member, said drive motor being responsive to the first signal from said first detector for adjusting the velocity of the photoconductive member.

9. A printing machine according to claim 8, wherein said detecting means includes:

a second set of timing marks positioned on a side marginal region of the photoconductive member opposed from the first mentioned side marginal region; and a second detector, responsive to the beam reflected from the photoconductive member in the side marginal region having said second set of timing marks thereon, to generate a second signal.

10. A printing machine according to claim 9, wherein said adjusting means includes an acousto-optic deflector, responsive to the first signal and the second signal, for adjusting the tilt of the beam relative to the photoconductive member.

11. A printing machine according to claim 9, wherein the raster input scanner includes a movable scanning element that scans the beam across the photoconductive member.

12. A printing machine according to claim 11, wherein said control system includes means, responsive to the first signal and the second signal, for setting the start of scan of said scanning element.

13. A scanner according to claim 2, wherein each of said timing marks extends in a direction that is substantially transverse to the direction of the imaging member.

14. A printing machine according to claim 7, wherein each of said timing marks extends in a direction that is substantially transverse to the direction of the photoconductive member.

* * * * *